US010873554B2

(12) United States Patent
Peacock et al.

(10) Patent No.: US 10,873,554 B2
(45) Date of Patent: Dec. 22, 2020

(54) DETERMINING CONSENSUS AMONG MESSAGE PARTICIPANTS BASED ON MESSAGE CONTENT

(71) Applicant: Microsoft Technology Licensing, LLC, Redmond, WA (US)

(72) Inventors: Andrew James Peacock, Seattle, WA (US); Shahil Soni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/259,214

(22) Filed: Sep. 8, 2016

(65) Prior Publication Data

US 2018/0069821 A1 Mar. 8, 2018

(51) Int. Cl.
| G06F 11/30 | (2006.01) |
| G06Q 30/00 | (2012.01) |
| G06Q 10/10 | (2012.01) |
| H04L 12/58 | (2006.01) |
| G06Q 10/00 | (2012.01) |

(52) U.S. Cl.
CPC ............ *H04L 51/26* (2013.01); *G06Q 10/00* (2013.01); *H04L 51/12* (2013.01)

(58) Field of Classification Search
None
See application file for complete search history.

(56) References Cited

U.S. PATENT DOCUMENTS

| 4,377,870 A | 3/1983 | Anderson et al. |
| 7,305,436 B2 | 12/2007 | Willis |
| 7,756,797 B2 | 7/2010 | Icenoggle |
| 8,996,625 B1 | 3/2015 | Singleton et al. |
| 9,201,928 B2* | 12/2015 | Chen ................. G06F 17/3053 |
| 10,068,257 B1* | 9/2018 | Mosthaf ............. G06Q 30/0203 |

(Continued)

FOREIGN PATENT DOCUMENTS

WO    2002093800 A1    11/2002

OTHER PUBLICATIONS

"Consensus Decision Making", Published on: Dec. 8, 2012, 24 pages, Available at: http://www.seedsforchange.org.uk/consensus.pdf.

(Continued)

*Primary Examiner* — Nicholas R Taylor
*Assistant Examiner* — Ho T Shiu
(74) *Attorney, Agent, or Firm* — Merchant & Gould P.C.

(57) ABSTRACT

Systems for determining and presenting consensus based on evaluating a message conversation are described. A consensus determination application may automatically parse each message of a series of messages related to a topic, using natural language processing or similar methods, to determine one or more suggestions and corresponding opinions for the one or more suggestions contained within those messages. The consensus for each of the one or more suggestions may be presented to a user. By viewing the automatically-determined consensus, the user may, without reading and evaluating all of the messages within the conversation, understand the level of consensus regarding the topic across the group of message participants. Accordingly, user burden is reduced and users may more effectively debate ideas and present suggestions with fewer misunderstandings, leading to an overall better user experience.

20 Claims, 10 Drawing Sheets

(56) References Cited

U.S. PATENT DOCUMENTS

| | | | |
|---|---|---|---|
| 2005/0138031 A1* | 6/2005 | Wefers | G06Q 10/06 |
| 2008/0249787 A1 | 10/2008 | Harrison | |
| 2010/0011072 A1 | 1/2010 | Mishchenko | |
| 2010/0246784 A1 | 9/2010 | Frazier et al. | |
| 2011/0161270 A1* | 6/2011 | Arnett | G06F 21/31 706/46 |
| 2011/0320373 A1 | 12/2011 | Lee et al. | |
| 2013/0007137 A1 | 1/2013 | Azzam et al. | |
| 2013/0060605 A1 | 3/2013 | Morgia et al. | |
| 2013/0066693 A1* | 3/2013 | Laird-McConnell | G06Q 30/02 705/14.11 |
| 2014/0108562 A1 | 4/2014 | Panzer | |
| 2014/0162241 A1* | 6/2014 | Morgia | G06Q 30/02 434/362 |
| 2014/0229855 A1 | 8/2014 | Anderson | |
| 2014/0272846 A1* | 9/2014 | Richling | G09B 19/00 434/236 |
| 2014/0317118 A1 | 10/2014 | Bao et al. | |
| 2014/0351257 A1* | 11/2014 | Zuzik | G06F 17/30867 |
| 2014/0365313 A1* | 12/2014 | Reese | G06Q 30/0269 705/14.66 |
| 2015/0046477 A1* | 2/2015 | Gershteyn | G06Q 30/0277 707/752 |
| 2015/0089399 A1 | 3/2015 | Megill et al. | |
| 2015/0365448 A1* | 12/2015 | Stifelman | H04L 65/403 709/204 |
| 2016/0171538 A1* | 6/2016 | Balasubramanian | G06Q 30/0255 705/14.53 |
| 2017/0063745 A1* | 3/2017 | Banerjee | H04L 51/046 |

OTHER PUBLICATIONS

"International Search Report and Written Opinion Issued in PCT Application No. PCT/US2017/049804", dated Oct. 23, 2017, 12 Pages.

* cited by examiner

| Mail | | | | | | | | ⌕² | 💬 | ⚙ | ? | ↶ Undo |
|------|--|--|--|--|--|--|--|--|--|--|--|--|
| | | | | | | | | | | | | Kat |

🔍 Search mail and people | ⊕ New | 🗑 Delete | Archive | Junk | ∨ | Sweep | Move To ∨ | Categories ∨ | ...

⟨ Folders

| | | Focused  Other | All ∨ |
|--|--|--|--|
| Inbox | 36 | Groupon Getaways | 3:38 PM |
| Archive | | Great Wolf Lodge \| Washington Coa... | |
| Junk | | Groupon Getaways See All Getaway D... | |
| Drafts | | Anna Gonzalez; Diane Krueger... | 3:14 PM |
| Sent | | Can someone share the latest releas... | |
| Deleted | 29 | What lies before us and what lies beyo... | |

⟨ Categories

| | | Suzy Coleman; Megan Taylor; Joe... | 3:07 PM |
|--|--|--|--|
| Family | 3 | Re: Name for the New Service | |
| Newsletters | 17 | As much as I like the ideas presented, I... | |
| Shopping | 11 | CBSSports.com | 3:01 PM |
| Social Updates | 5 | There's Still Time To Get Into The G... | |
| Travel | | BUT THERE'S STILL TIME TO GET INTO... | |
| | | Jack White | 12:05 PM |
| | | Check out these photos... | |

Re: Name for New Service ⟵ 210

Suzy Coleman ⟵ 212
Tue 6/10/2014 3:07 PM ⟵ 214

As much as I like the ideas presented, I think we should
consider going with something a little more prosaic. Let's
call it what it is. Maybe "Personal Outfitter" or something ⟵ 216
like that

Re: Name for New Service

Joe Doe
Tue 6/10/2014 2:55 PM

⟵ 220  218

| | |
|--|--|
| "Your Wardrobe Attendant" | 3 |
| Megan Taylor; Ravi Patel; Frederick Morris | Change |
| ⟵ 222 | |
| "Dress You Like a King" ⟵ 224 | 2 |
| Joe Doe; Kat Larsson | Current |
| ⟵ 226 | |
| "Personal Outfitter" ⟵ 228 | 1 |
| Suzy Coleman | Change |

DETERMINING CONSENSUS AMONG MESSAGE PARTICIPANTS BASED ON MESSAGE CONTENT

BACKGROUND

Communication in various message formats continues to increase as users increasingly collaborate around the world. Frequently, users communicate and debate ideas with other users over vast distances and time delays. These conversations may include anywhere from two users to hundreds, with an ever-increasing number of messages as users chime in to debate and discuss ideas. Workers in California may discuss an idea through their workday over email, log off for the evening, and wake to discover that coworkers in Japan have added over 100 emails to the conversation overnight. Today, those workers must spend significant time reviewing those emails to determine which coworkers came up with new ideas and which coworkers weighed in for and against other ideas. Even more daunting is the prospect of identifying any meaningful consensus among the many diverse replies. This process of identifying preferred options—much less group consensus—can be very time consuming and frustrating. For instance, some messages may not specifically state which ideas they refer to, some participants may change their minds over time, and new ideas may be tossed into the mix during debate. A user may also find, after the fact, that he or she has misunderstood another participant's current opinion, or offered suggestions that other participants have already discussed.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for determining and presenting a consensus status regarding suggestions and opinions in a set of one or more messages. In aspects, when a user receives one or more messages from one or more authors on a topic, those messages may contain some suggestion for an idea or action to which other message participants may wish to agree, disagree, or offer counter-suggestions. This thread of messages may become long or cumbersome to interpret and determine which suggestions are receiving consensus from among the participants. The message participants may find it convenient for the system to provide a digest of the suggestions and opinions found within the message thread, along with a tally of which suggestion(s) various participants currently support. Such a digest allows a user to quickly and efficiently understand the current status of a message thread and to provide his or her opinion without needing to read what could be hundreds of messages. This allows the user to more effectively participate in the debate and offer meaningful suggestions without duplicating ideas presented by others.

A consensus determination application addresses the above issues by automatically interpreting the messages within a thread on a topic by use of Natural Language Processing (NLP) and determining which suggestions have been offered within the thread and which participants have agreed or disagreed with each suggestion. Over time, a thread participant may change his or her mind or become more attracted to a later suggestion. In this case, the application may interpret this change in position from statements made. The application may also provide the participant with an interface for selecting which suggestion he or she prefers or selecting whether he or she agrees with the current yes/no question that is the topic of the thread. The application may provide an overall measure of consensus within the message, itself, within a message reading pane, within a list pane of messages, or some combination of these locations.

In an aspect, a computer system is provided. The computer system includes a processing unit and a memory storing computer executable instructions that, when executed by the at least one processing unit, cause the system to perform a method. The method includes receiving a message, parsing the message to extract information and analyzing the extracted information to identify a topic and a suggestion related to the topic. The method further includes, when the identified suggestion is a new suggestion, adding the identified suggestion to a set of one or more suggestions. Additionally, based at least in part on analyzing the extracted information, the method includes identifying an opinion corresponding to the identified suggestion and adding the identified opinion to a corresponding set of opinions for the identified suggestion. The method further includes determining a level of consensus by evaluating the corresponding set of opinions for each of the one or more suggestions and providing a visual representation of the level of consensus for each suggestion of the one or more suggestions.

In another aspect, a method for determining consensus related to a topic is provided. The method includes receiving a message, parsing the message to extract information, and analyzing the extracted information to identify the topic and a suggestion related to the topic. When the identified suggestion is a new suggestion, the method further includes adding the identified suggestion to a set of one or more suggestions. Additionally, the method includes identifying an opinion corresponding to the identified suggestion and adding the identified opinion to a corresponding set of opinions for the identified suggestion in the set of one or more suggestions. The method also includes determining a level of consensus by evaluating the corresponding set of opinions for each of the one or more suggestions and providing a visual representation of the level of consensus for each suggestion of the one or more suggestions.

In yet another aspect, a method for determining and presenting consensus related to a topic is provided. The method includes receiving a plurality of messages, wherein the plurality of messages are related to the topic, extracting metadata from the messages and extracting content information from the messages. Additionally, the method includes identifying one or more suggestions and one or more opinions related to each suggestion from the messages based on one or more of: the extracted content information and the extracted metadata. The method further includes determining a level of consensus by evaluating the one or more opinions corresponding to each suggestion and providing a visual representation of the level of consensus for each suggestion.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates an interface for implementing consensus determination and representation within a message reading pane, according to an example embodiment.

FIG. 3 illustrates an interface for implementing a consensus determination and representation within a message list pane and an alternative representation within a message reading pane, according to an example embodiment.

DETAILED DESCRIPTION

Figure 1:
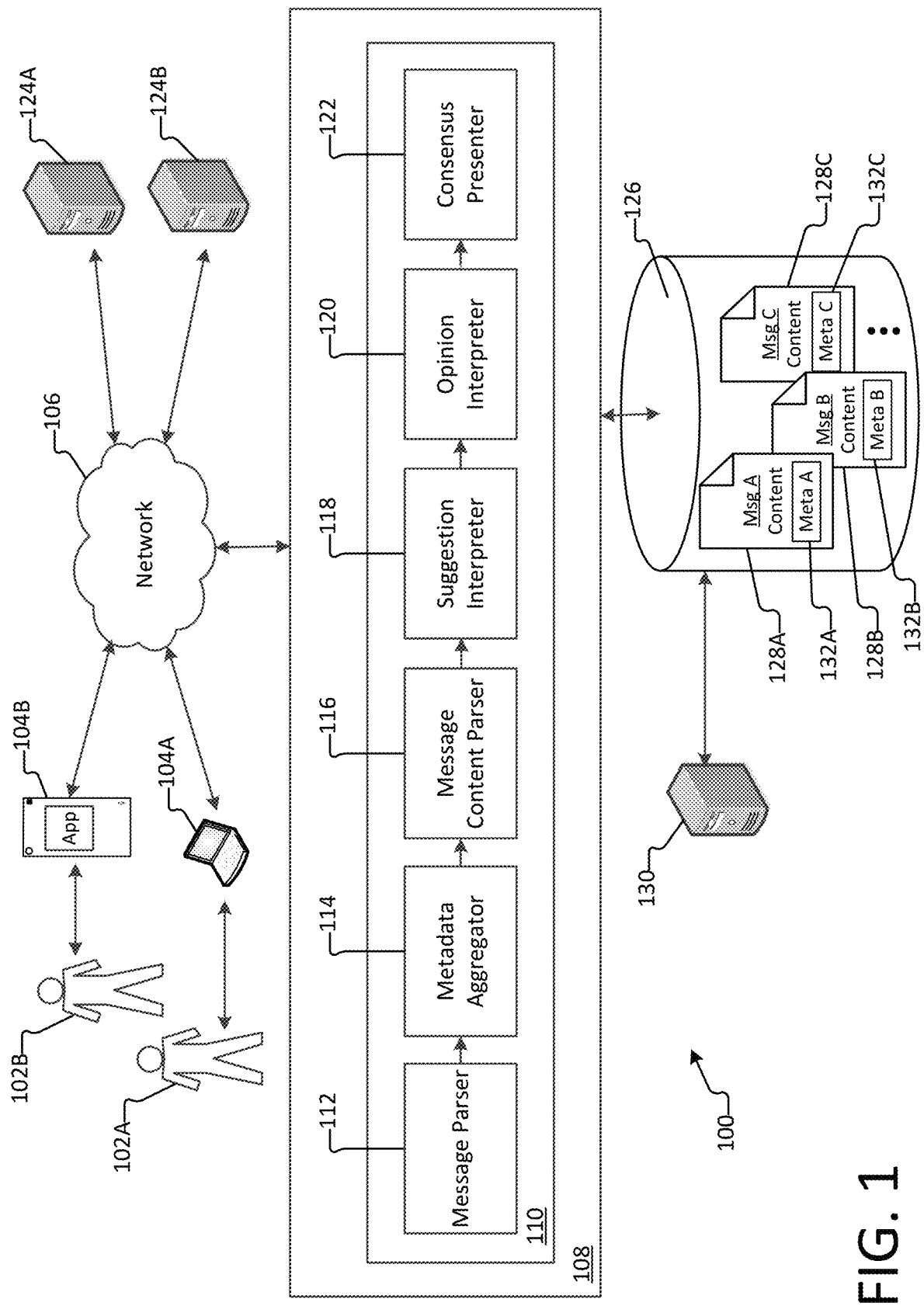
FIG. 1 illustrates a system for determining consensus based on message content, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for determining suggestions, opinions, and consensus from among messages corresponding on a given topic. As used herein, a suggestion may be any suggestion for an action, plan, or other idea that participants may wish to debate. Example suggestions may include "Let's go to Trieste Café for lunch," or "We should launch our new product on December 17," etc. Within any suggestion may be viewed an inherent question related to that suggestion, such as "Where should we go to lunch?" or "Should we launch our new product on December 17?" or more generically "When should we launch our new product?" An opinion, as used herein, may be interpreted as any expression of agreement or disagreement with a given suggestion and may be viewed as providing the user's response to its question. Opinions may be a simple "yes" or "no," if the related suggestion contains a yes/no question, such as "Should we launch our product on December 17?" Opinions may also be the choice between several suggestions. For example, if participants have suggested three restaurants for lunch, "Trieste Café," "Joe's Burger Barn," and "Andy's Mexican," an opinion may be selecting "Trieste Café." It should be noted that a message including a suggestion may be interpreted as providing the new suggestion and also including the author's opinion in favor of that suggestion. For example, a user may respond to a message topic about lunch locations wherein previous participants have debated between "Trieste Café" and "Joe's Burger Barn" by stating "I'm not in the mood for either of those, but Andy's Mexican has a great Taco-Tuesday special today!" The application may interpret the statement as adding a third suggestion (Andy's Mexican) and providing an opinion in favor of the new suggestion. From that point, other message topic participants may wish to opine in favor of Andy's Mexican, even if they had previously opined in favor of the original two suggestions. Furthermore, the application may determine a participant's opinion based on both the message content and context, such as metadata. For example, a user may simply write "That's a great idea!" without identifying what he or she believes is a great idea. Based on metadata, such as the message to which the user is replying, the application may determine on which suggestion the user is opining. For example, if the user is replying to a message suggesting "Andy's Mexican" for lunch, the application may determine that the user's message is an opinion in favor of "Andy's Mexican."

In particular, a consensus determination application may automatically identify one or more suggestions contained within each message. It may then determine which message participants agree or disagree with each of the suggestions, based on each message's content and metadata. Finally, the application may display these suggestions and opinions to a user in such a way as to inform the user as to the current consensus among the participants of the message conversation. Accordingly, the user is not required to read every message within the conversation to get an overview of the feelings of the participants.

It is with respect to these and other general considerations that embodiments have been made.

FIG. 1 illustrates a system 100 for determining consensus among message topic participants based on message content, according to an example embodiment.

As illustrated, system 100 may comprise one or more client computing devices 104 (e.g., client computing devices 104A and 104B) that may execute a client version of a consensus determination application capable of displaying the current consensus found within a given message conversation. In some examples, the client consensus determination application may execute locally on a client computing device 104. For example, the client consensus determination application (e.g., mobile app) may operate in communication (e.g., via network 106) with a corresponding server version of consensus determination application 110 executing on one or more server computing devices, e.g., server computing device 108. In still other aspects, rather than executing a client version of a consensus determination application, the one or more client computing devices 104 may remotely access, e.g., via a browser over network 106, the consensus determination application 110 implemented on the one or more server computing devices 108. In this regard, consensus determination application 110 is capable of determining suggestions, opinions, and consensus from within a message conversation and presenting the current suggestions, opinions, and consensus to a user.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client consensus determination application and/or remotely accessing consensus determination application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an intranet.

As described above, the consensus determination application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud-based computing environment). Server computing device 108 may provide data and/or metadata regarding a message to and from the one or more client computing devices 104 and/or one or more other server computing devices (e.g., server computing devices 124A and/or 124B) via network 106.

As used herein, a message may be understood to be a communication from within any computerized means of communication between individuals, e.g. an email message system (e.g. Outlook, Gmail, Thunderbird, etc.), a text message system (e.g. SMS text, Apple iMessage, etc.), an instant message system (e.g., AIM, Lync, Facebook Messenger, WhatsApp, Google Chat, etc.), a video message system (e.g., Skype, SnapChat, Google Hangouts, etc.), and the like. Consensus determination application 110 may use messages of one or more formats in determining consensus among topic participants. A message may also include metadata as it is usually understood, such as sender, receivers, date sent, date received, priority, subject, attachment information, and the like.

As should be appreciated, one or more messages (e.g., messages 128A, 128B, and 128C) may be stored in one or more storage locations accessible to consensus determination application 110, e.g., storage 126. In at least some examples, the one or more messages may be stored in different storage locations within a distributed environment (e.g., cloud-based computing environment) that is accessible to the consensus determination application 110 over a network, e.g., network 106.

As illustrated in FIG. 1, the consensus determination application 110 may include a message parser 112, a metadata aggregator 114, a message content parser 116, a suggestion interpreter 118, an opinion interpreter 120, and a consensus presenter 122. The various components may be implemented using hardware, software, or a combination of hardware and software. Moreover, the various components may be executed on the same server computing device (e.g., server computing device 108) or on other server computing devices (e.g., server computing devices 124A, 124B and/or 130). As described above, the consensus determination application 110 may be configured to present the aggregate suggestions and related opinions to convey the current consensus of the topic participants. In some aspects, the consensus determination application 110 may undertake one or more pre-processing steps in order to accomplish consensus determination.

For instance, when a message is received, e.g., for storage in storage 126, message parser 112 may parse the received message to detect message content and/or metadata. In some aspects, message parser 112 may be implemented by server computing device 108. In other aspects, message parser 112 may be implemented by another server, for instance, a server such as server computing device 130 that is in communication with and/or manages a storage location, e.g., storage 126. As described above, a message may include message content, metadata, etc.

Metadata aggregator 114 may receive metadata content from message parser 112 for each message received for storage, e.g., storage 126. In some aspects, metadata aggregator 114 may be implemented by server computing device 108. In other aspects, metadata aggregator 114 may be implemented by another server, for instance, a server such as server computing device 130 that is in communication with and/or manages a storage location, e.g., storage 126. As detailed above, a message may be associated with metadata such as sender, receivers, send time/date, receive time/date, priority, subject, attachment information, reply relationships, etc. Metadata aggregator 114 may collect and/or generate metadata indicative of the message content. Metadata aggregator 114 may further aggregate the metadata and may organize the aggregated metadata into structured fields, with each field storing a different type of aggregated metadata. In aspects, "metadata syntax" may refer to rules for structuring the fields that store the aggregated metadata. As described later, this metadata may be used to determine a current opinion to assign to a given message participant, to determine to which suggestion a given opinion should be related, and other such tasks.

In further aspects, metadata aggregator 114 may append the structured fields of aggregated metadata to each message. For instance, as illustrated by FIG. 1, first aggregated metadata (e.g., Meta A 132A) may be appended to a first message (e.g., Msg A 128A) that is stored in storage 126, second aggregated metadata (e.g., Meta B 132B) may be appended to a second message (e.g., Msg B 128B) that is stored in storage 126, and third aggregated metadata (e.g., Meta C 132C) may be appended to a third message (e.g., Msg C 128C) that is stored in storage 126. In some aspects, the aggregated metadata may incorporate the original metadata associated with each message such that the original metadata is organized within the structured fields of aggregated metadata. In other aspects, the aggregated metadata may be organized into the structured fields and stored in a separate location from the original metadata associated with a message. In some examples, aggregated metadata may be stored with the message by metadata aggregator 114 as a pre-processing step when each message is stored in storage 126; in other examples, aggregated metadata may be stored with the message by metadata aggregator 114 during message processing at some other time.

In an example, a user (e.g., user 102A) may draft a message to another user (e.g., user 102B) using a messaging application, e.g., an email application, an instant messaging application, a SMS application, and the like. The messaging application may be in communication with and/or incorporated with the consensus determination application 110. For example, the message may include one or more message fields, such as a "Subject" field, a "To" field, a "From" field, a "Message Body" field, and the like. The "To" field may include at least one user identifier for each recipient of the message (e.g., recipient identifier(s)) and the "From" field may include at least one user identifier for a sender of the message (e.g., sender identifier). A user identifier may be a user name (or user alias), a user email address, a user phone number, and the like. User identifiers may be used by the messaging application to route the message from the sender to the one or more recipients of the message. User identifiers may further communicate the identity of the sender of the message to the one or more recipients, as well as other recipients of the message in the conversation.

In further examples, the sender may enter subject content into the Subject field of the message to indicate a topic, a purpose, a task, or other information regarding the message. In still further examples, the sender may enter message content into the Message Body field of the message. Message content may include a narrative, a description, instructions, or other information for communication to the one or more recipients of the message, as well as a new suggestion or an opinion on a previous suggestion.

At any time during drafting of a message, routing of a message and/or receipt of a message, message content parser 116 may process the message to extract and analyze information from the message content. In some aspects, message content parser 116 may be implemented by server computing device 108. In other aspects, message content parser 116 may be implemented by another server, for instance, a server that is in communication with and/or implements a messaging application. For example, message content parser 116 may extract information from the message and analyze the extracted information to identify key message terms and/or key message phrases (hereinafter referred to collectively as "key message terms"). As used herein, a key message term may be indicative of the message author's suggestion or an opinion on a previous message suggestion. Key message terms may be identified by any suitable means, e.g., using techniques such as semi-structured information extraction or natural language processing (NLP). For instance, these or similar techniques may be used to extract n-tuples from the message. Each n-tuple, which is a structured set of elements, may be further processed to identify one or more key message terms.

Message content parser 116 may further assign a priority to each key message, e.g., based on a field from which the key message term was extracted, based on a sequential position of the key message term within the message, or other suitable criteria. For instance, in some aspects, key message terms falling within subject content may be assigned a higher priority than key message terms falling within message content. In further aspects, key message terms occurring in an earlier sequential position within the message may be assigned a higher priority than key message terms occurring in a later sequential position within the message. As should be appreciated, priorities may be assigned to the key message terms via any suitable algorithm or set of rules. In aspects, as will be described further below, at least some of the key message terms may be indicative of a suggestion and/or an opinion regarding a suggestion within the message. For instance, the key message term may include, for instance, a term, a phrase, a date, a time, or any other extracted information. Key message terms may be used, among other things, to determine to which topic a message belongs, what, if any, suggestions it contains, and what opinion it expresses.

In an example, a message may be defined by: a "From" field including a sender name "Suzy Coleman" associated with a sender email address suzy@genco.com; a "To" field including a first recipient name "Joe Doe" associated with a recipient email address joe@genco.com and a second recipient name "Megan Taylor" associated with a second recipient email address megan@genco.com; a "Subject" field including the text "Name for New Service"; and a "Message Body" field including message content of: "As much as I like the ideas presented, I think we should consider going with something a little more prosaic. Let's call it what it is. Maybe 'Personal Outfitter' or something like that." Based on the above information, message content parser 116 may extract the sender's name and email address and the first and second recipients' names and email addresses. The message content parser 116 may further extract subject content including key message term "Name for New Service." Message content parser 116 may determine that the message relates to the topic of determining the name for the new service. Message content parser 116 may also extract the key message term "Maybe 'Personal Outfitter' or something like that."

Additionally, at any time during drafting of a message, routing of a message or receipt of a message, suggestion interpreter 118 may interpret the key message terms to determine whether there is a suggestion within the message content, and whether that suggestion is the same as a previously-expressed suggestion. In some aspects, suggestion interpreter 118 may be implemented by server 108. In other aspects, suggestion interpreter 118 may be implemented by another server, for instance, a server such as server 130 that is in communication with and/or manages a storage location, e.g., storage 126. For instance, with reference to the example message above, suggestion interpreter 118 may interpret the key message term "Maybe 'Personal Outfitter' or something like that," to identify the phrase "Personal Outfitter" as a suggestion for the topic. Based on the previous suggestions related to the topic, suggestion interpreter 118 may determine that the suggestion is a new suggestion and that the author, Suzy Coleman's opinion should not or at least should no longer be associated with any other suggestion.

In aspects, opinion interpreter 120 may interpret the key message terms received from message content parser 116 to determine the message author's opinion related to the message topic. Opinion interpreter 120 may further receive aggregated metadata associated with each of the plurality of files from metadata aggregator 114. In some aspects, opinion interpreter 120 may be implemented by server computing device 108. In other aspects, opinion interpreter 120 may be implemented by another server, for instance, a server such as server computing device 130 that is in communication with and/or manages a storage location, e.g., storage 126. For example, opinion interpreter 120 may use said key message terms and metadata determine whether each key message term includes an opinion related to a previously-expressed suggestion. For example, opinion interpreter 120 may match one or more key message terms with aggregated metadata to identify a related suggestion for the opinion.

For example, an email replying to the above example suggesting "Personal Outfitter" as a name for a new service, but containing only the text "I like that idea—let's go with that," and with metadata showing that it was sent in response to Suzy Coleman's email may be interpreted by opinion interpreter 120 as a positive opinion for the "Personal Outfitter" suggestion, despite not mentioning the suggestion, itself. In this way, opinion interpreter 120 uses key message terms and metadata to relate each opinion to the corresponding suggestion.

In addition, opinion interpreter 120 may determine that a message author has previously provided an opinion that the new message has been modified or contradicted. For example, if Joe Doe has previously offered an opinion in support of a different service name, such as "Dress You Like a King," but responds affirmatively to Suzy Coleman's suggestion of "Personal Outfitter," opinion interpreter 120 may determine that Joe Doe's opinion has now changed from "Dress You Like a King" to "Personal Outfitter" and may record and present that change accordingly.

Continuing with the examples above, consensus presenter 122 may receive suggestion information from suggestion interpreter 118 and opinion information from opinion interpreter 120. In some aspects, consensus presenter 122 may be implemented by server computing device 108. In other aspects, consensus presenter 122 may be implemented by another server, for instance, a server that is in communication with and/or implements a messaging application. In some aspects, consensus presenter 122 may present a consensus status within message content for each message within a topic. In other aspects, consensus presenter 122 may present a consensus status within a message viewer, a message reading pane, or a message viewing window. In yet further aspects, consensus presenter 122 may present consensus information within a message list pane or other method of viewing multiple messages.

In some aspects, consensus presenter 122 may present suggestion and opinion information as a list of suggestions with a numeric tally of opinions in favor of each suggestion. In other aspects, consensus presenter 122 may present suggestion and opinion information as a graph, chart, bar, or other graphical representation. In yet further aspects, consensus presenter 122 may present suggestion and opinion information with names of individual participants and their corresponding opinions. Additional aspects may include indications for a participant who has not yet offered an opinion, a participant whose opinion is unclear from context, or a participant whose opinion is ambiguous.

In some aspects, consensus presenter 122 may offer a participant a method for modifying or offering his or her opinion via buttons, check-boxes, or other means for indicating his or her opinion. In some aspects, when receiving such input from the participant, the consensus presenter 122 may record that input as an opinion message within the message parser 112. In other aspects, the consensus presenter 122 may record user opinion input as data within opinion interpreter 120. Further means of recording and storing opinions from users via consensus presenter 122 are readily available.

Continuing with the examples above, when consensus presenter 122 presents a list of current suggestions for the name of a new service, it may list three suggestions as "Your Wardrobe Attendant," "Dress You Like a King," and "Personal Outfitter." Consensus presenter 122 may provide a number representing the people whose opinions agree with each suggestion next to each suggestion. Consensus presenter 122 may also, alternatively or in addition, provide the names of all participants who agree with each suggestion. Consensus presenter 122 may also provide buttons to allow the current user to change his or her opinion to one of the non-selected choices. Consensus presenter 122 may also indicate which choice is currently recorded for the current user.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

FIG. 2 illustrates an interface for implementing consensus determination application within a message reading pane, according to an example embodiment.

As illustrated, an interface 200 of an email application is provided. Interface 200 includes a navigation pane 202, a list pane 204, and a reading pane 206. Email 208 is displayed in reading pane 206 and list pane 204. Email 208 includes a subject line 210, entitled "Re: Name for New Service," a sender 212 named "Suzy Coleman," and a sent time 214 of "Tuesday, Jun. 10, 2014, at 3:07 PM." Email 208 further includes a message 216, which states: "As much as I like the ideas presented, I think we should consider going with something a little more prosaic. Let's call it what it is. Maybe "Personal Outfitter" or something like that."

Further included within the reading pane 206 is a consensus pane 218 showing the current consensus for the topic "Name for New Service." Within the consensus pane 218 are multiple suggestion boxes 220, each suggestion box 220 including the suggestion 222, a list of individuals in favor 224 of each suggestion 222, a number indicator 226 of individuals in favor 224 of each suggestion 222, and a selection button 228 offering the user a chance to change his or her opinion or indicate the current selection.

As detailed above, at any time during drafting of email 208, routing of email 208 or receipt of email 208, a message content parser (e.g., message content parser 116) may parse email 208 to extract information. For instance, email 208 may be parsed to identify the sender 212 (e.g., Suzy Coleman) and the sent time 214 (e.g., Tuesday, Jun. 10, 2014, at 3:07 PM). Further, subject content including key message term "Name for New Service" may be extracted. The email 208 may further be parsed to extract the key message term "Personal Outfitter" which may be a new suggestion.

Each key message term may further be prioritized, e.g., by message content parser 116. In some aspects, key message terms falling within subject content may be assigned a higher priority than key message terms falling within message content to, for example, determine the relevant topic of the message and its suggestions or opinions. In further aspects, key message terms occurring in a sequentially later email may be assigned a higher priority than key message terms occurring in an earlier email from the same user. As should be appreciated, priorities may be assigned to the key message terms via any suitable algorithm or set of rules.

Additionally, at any time during drafting of email 208, routing of email 208 or receipt of email 208, a suggestion interpreter (e.g., suggestion interpreter 118) may parse and interpret the content of email 208 to determine if it contains a new or existing suggestion. Continuing with the examples above, the application may identify the suggestion "Personal Outfitter" as a new suggestion of a name for the new service.

Additionally, an opinion interpreter, e.g., opinion interpreter 120, may determine whether the key message terms indicate that the message contains an opinion related to any known suggestion. Opinion interpreter 120 may use content data or metadata to determine whether the message contains an opinion related to a suggestion. For example, with reference to the examples above, it may be determined that, by suggesting "Personal Outfitter," Suzy Coleman's opinion is in favor of her new suggestion and that she is rescinding any support she may have previously offered for another suggestion.

A consensus presenter, e.g., consensus presenter 122, may receive suggestion and opinion information related to a given topic related to the received message 208. Based on the received information, consensus presenter 122 may present the current suggestion and opinion information to the user. As illustrated by FIG. 2, suggestions may be listed in descending order of current agreement, or in another order as necessary. Consensus presenter 122 may present each suggestion 222 as text, along with its current number indicator 226 of individuals in favor 224 and list of individuals in favor 224. Consensus presenter 122 may also offer the user an interface for setting or changing his or her current opinion, via a selection button 228 or other control.

The consensus pane 218 may also include suggestion boxes 220 that indicate which users' opinions were unclear or ambiguous. This may be indicated by stating "Ambiguous" or other term to indicate that the user appeared to express an opinion, but that the application was unable to determine what the user intended. In this way, the application may alert users that it has not included that user's opinion so that the user associated with the ambiguous opinion user may manually indicate his or her preference via the selection buttons 228 or send a clearer message.

The consensus pane 218 may further include suggestion boxes 220 that indicate which users have not offered an opinion at all. This may be indicated by stating "Unknown" or other term to indicate that the user has not participated in the topic or participated without expressing an opinion. In this way, the application may alert users that a given user has not offered an opinion, so that said user may indicate his or her opinion via selection buttons 228 or by writing a reply message to the topic.

In an aspect of the application, consensus presenter 122 may allow a user, when setting or changing his or her opinion via selection button 228 or other control, to indicate whether that change is based on the user's mind changing, or whether the consensus determination application misinterpreted the user's opinion. In this way, if the application erred, the consensus determination application may gather information on how the user expresses opinions and may update its algorithm for determining that user's opinions. On the other hand, if the user's mind has changed based on arguments from other message participants, then the application may update the user's present opinion without modifying its algorithms.

In another aspect of the application, consensus presenter 122 may allow a user to assign a task to one or more users based on the consensus pane 218. For example, the consensus pane 218 may allow a user to right-click on the name of an individual in favor 224 under a suggestion to assign the user a task via commonly-available tasking methods or applications. In this way, for example, a manager may see which of his or her employees are pushing for a certain outcome and may provide them with tasks to help implement that outcome. Assigned tasks are not necessarily limited to the nature of the user's vote.

As illustrated by FIG. 2, a consensus determination application (e.g., consensus determination application 110) automatically parses one or more messages to determine each offered suggestion on a given topic, and presents one or more of those suggestions with a corresponding number of opinions in favor of the suggestion to one or more users participating in the conversation. In this way, the consensus determination application automatically interprets and presents a large amount of data to a user, saving that user from reading an entire message conversation to determine the thrust of the conversation participants' opinions. While the user may still wish to read the conversation for certain details, the user may do so with an awareness of the overall, current consensus, thus reducing the burden on said user and increasing efficiency.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

Figure 3:
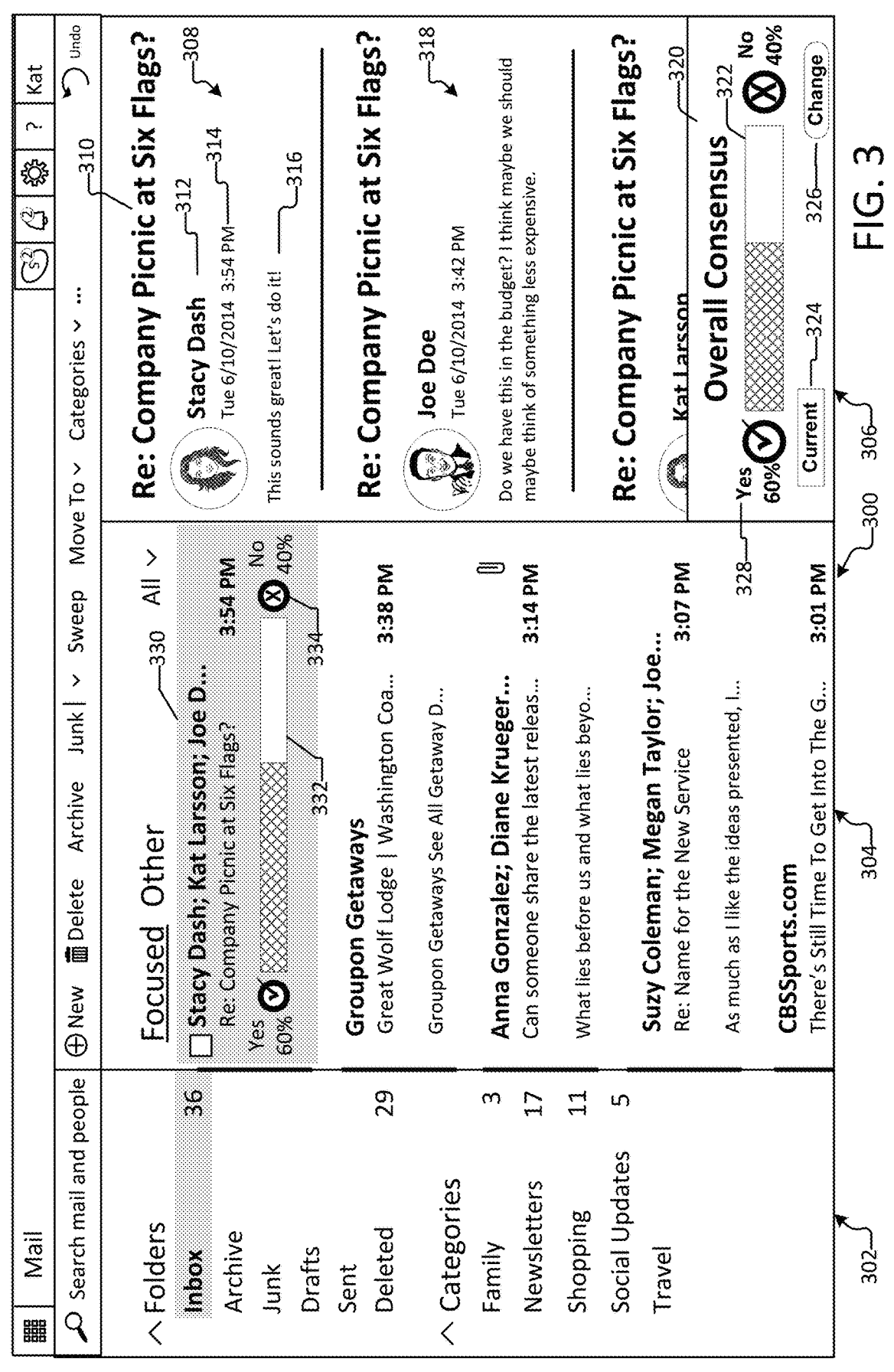

FIG. 3 illustrates an interface for implementing a consensus determination and representation within a message list pane and an alternative representation within a message reading pane, according to an example embodiment.

As illustrated, an interface 300 of an email application is provided. Interface 300 includes a navigation pane 302, a list pane 304, and a reading pane 306. A reply message (e.g., reply 308) is displayed in reading pane 306 and list pane 304. Reply 308 includes a subject line 310, entitled "Re: Company Picnic at Six Flags?" a sender 312 named "Stacy Dash," and a sent time 314 of "Tuesday, Jun. 10, 2014, at 3:54 PM." Reply 308 further includes a message 316, which states: "This sounds great! Let's do it!" and a previous email 318 with a different author, but the same subject line. As further illustrated, reply 308 responds to previous email 318.

Further included within the reading pane 306 is a consensus pane 320 showing the current consensus for the topic "Company Picnic at Six Flags." Within the consensus pane 320 is a consensus graph 322 showing the comparison of people agreeing to the suggestion or disagreeing with it. This consensus graph 322 may appear as a bar, bar graph, meter, pie chart, or any other form of graphic indicator. At each end of the graph 322 is a percentage indicator 328 showing which percentage of the graph is "Yes" and which is "No" and the relative percentages among participants holding each opinion. Beneath each percentage indicator 328 is a current selection indicator 324, showing the user's current opinion, or an opinion change button 326 that the user may activate to change his or her opinion on the suggestion.

Consensus pane 320 may also include indicators for users whose opinions are ambiguous or for users who have not expressed any opinion. Therefore, for a binary (yes/no, true/false, etc.) opinion, the list of opinions may include values such as "yes," "no," "ambiguous," and "not expressed."

Also included within the list pane 304 is a series of emails. Email 330 in the list pane 304 may correspond to reply 308 within the reading pane 306. List pane 304 may also include a list consensus graph 332 within the listing for email 330 to indicate the current consensus on the topic discussed in email 330. Similar to consensus graph 322, list consensus graph 332 may appear as a bar, bar graph, meter, pie chart, or any other form of graphic indicator. At the ends of the list consensus graph 332 are indicators 334 showing which portions of the graph indicate which opinion, such as "Yes" or "No" and their relative strength among topic participants.

As detailed above, at any time during drafting of reply 308, routing of reply 308 or receipt of reply 308, a message content parser (e.g., message content parser 116) may parse reply 308 to extract information. For instance, reply 308 may be parsed to identify the sender 312 (e.g., Stacy Dash) and the sent time 314 (e.g., Tuesday, Jun. 10, 2014, at 3:54 PM). Further, subject content including key message term "Company Picnic at Six Flags" may be extracted. The reply 308 may further be parsed to extract the key message term "Let's do it" which may be an opinion in favor of the current suggestion.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed herein.

Figure 4:
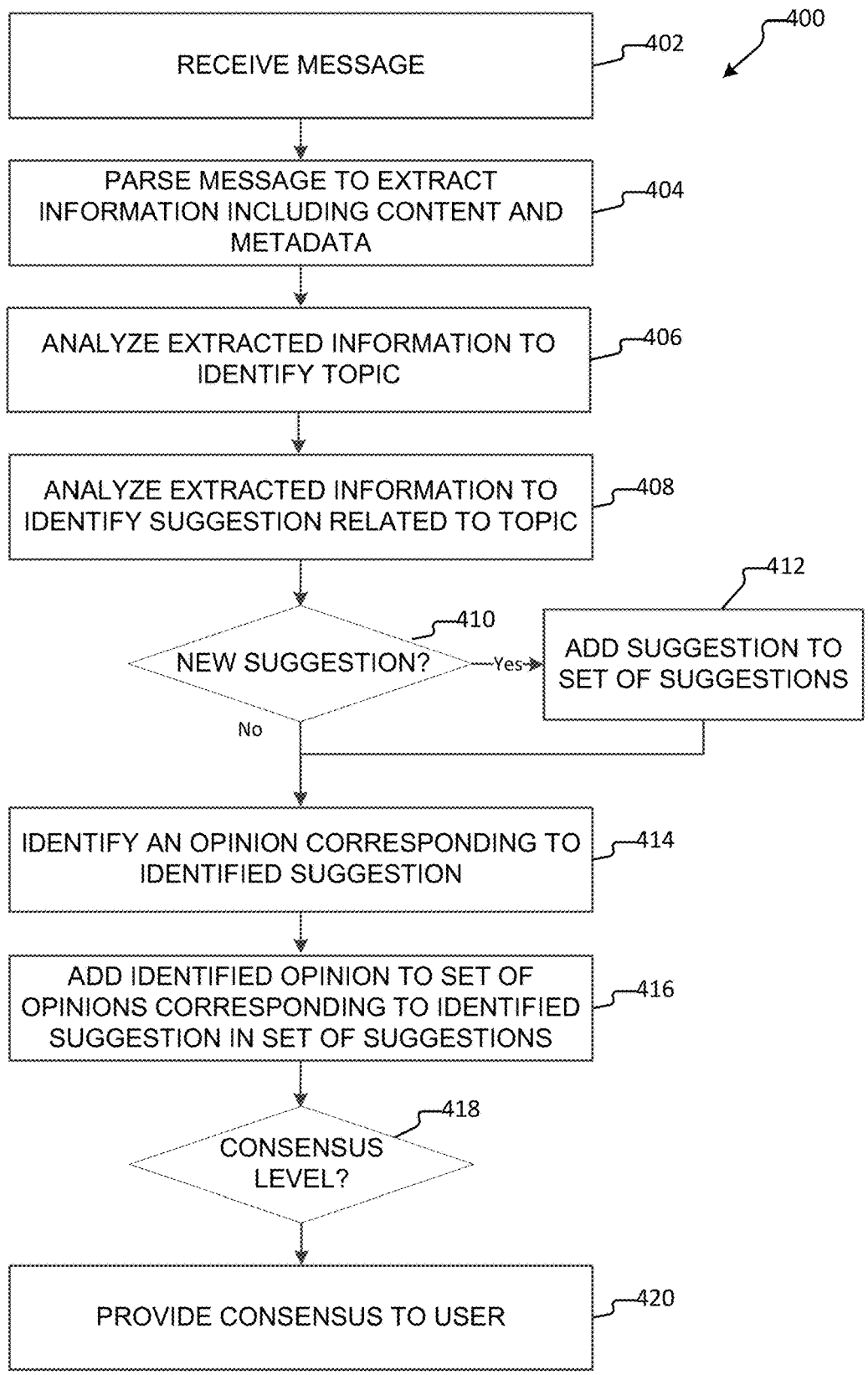
FIG. 4 illustrates a method for interpreting a message to determine its relevant suggestion and opinion and incorporating that information into a set of suggestions and corresponding opinions to determine a consensus, according to an example embodiment.

FIG. 4 illustrates a method for interpreting a message to determine its relevant suggestion and opinion and incorporating that information into a set of suggestions and corresponding opinions to determine a consensus, according to an example embodiment.

Method 400 begins with receive message operation 402, where a message is received. In aspects, the message may be received for storage, e.g., in storage location 126. Receiving a message may occur in a variety of ways, such as through an SMTP email, an SMS text message, a Skype message, a Twitter tweet, a Facebook message, a Google Chat message, a Google Hangout message or video, an Apple iMessage, a SnapChat video, a phone message, or any other recorded form of communication. Moreover, the message may be received by an appropriate messaging application executing on a computing device, e.g., client computing device 104 or server computing device 108.

At parse message operation 404, the message may be parsed to extract information, e.g., message content and/or message metadata. In aspects, a message parser, e.g., message parser 112, may extract such information, as discussed above. In some aspects, the message may be parsed by a message parser, e.g., message parser 112, a metadata aggregator, e.g. metadata aggregator 114, or a message content parser, e.g. message content parser 116. Any of these parsers may contribute data to a suggestion interpreter, e.g. suggestion interpreter 118 and/or an opinion interpreter 120, which may then analyze the extracted information, as described above.

At analyze operation 406, the extracted information (e.g., message content and/or message metadata) may be analyzed to detect a topic, if any, to which the message relates. Frequently, message content extracted from the subject of a message relates to a topic being discussed and other messages in a conversation may also include the same subject. In other cases, the list of participants on a message and the timing of the message, combined with the body of the message may be used to determine to which topic the message relates. In some forms of communication (e.g., email correspondence or group chat correspondence), the message may be sent within a conversation structure that, when combined with the content of the message, allows the consensus determination application to determine a topic relevant to the message and/or conversation.

At analyze operation 408, the extracted information may be analyzed to identify a suggestion. For example, a suggestion may be identified by natural language processing ("NLP"), as described above.

At determination operation 410, it may be determined whether the identified suggestion is a new suggestion or a previous suggestion within the topic. For instance, the consensus determination application may use natural language processing ("NLP") to determine whether the message creator intended a new suggestion (e.g., by identifying key terms such as "how about" or "what do you think of" or "I think we should," and the like) or whether the message creator was referring to a previous suggestion (e.g., by identifying key terms such as "I like it" or "I agree" or "yes"). For example, if a message contains the phrase "I think we should go to Trieste Café for lunch," the application may ascertain through NLP or another method, that the message contains a new suggestion for "Trieste Café." Suggestion information may also be determined by metadata associated with the message. For example, if a message does not contain an explicit suggestion, but is a reply to another message with a previous suggestion, the application may infer that the previous suggestion is the suggestion relevant to the current message. If it is determined that the identified suggestion is a new suggestion, the method proceeds to identify opinion operation 414; whereas if it is determined that the identified suggestion is a previous suggestion, the method proceeds to add suggestion operation 412.

At add suggestion operation 412, the new suggestion is added to a set of suggestions related to the relevant topic. In aspects, the determination of whether a suggestion is new and the addition of that suggestion to the set of suggestions may be performed by a suggestion interpreter, e.g., suggestion interpreter 118.

At identify opinion operation 414, the extracted information (e.g., message content and/or message metadata) may be analyzed to determine whether the message includes an opinion corresponding to one or more suggestions of the set of suggestions associated with the relevant topic. An opinion may be identified by natural language processing ("NLP") such that the consensus determination application discerns whether the message creator intended to support one or more of the suggestions of the set of suggestions relevant to the topic. For example, if a message contains the phrase "I think we should go to Trieste Café for lunch," the consensus determination application may ascertain through NLP or another method, that the message offers an opinion in favor of the "Trieste Café" suggestion. An opinion may also be identified based on metadata associated with the message. For example, if a message does not contain an explicit suggestion, but is a reply to another message including a suggestion, the consensus determination application may infer that the opinion of the reply relates to the previous suggestion. For example, if a message contains only the text "That sounds great," but is in reply to an email suggesting "Trieste Café," the consensus determination application may infer that "That sounds great" is a positive opinion in favor of the "Trieste Café" suggestion. Similarly, if the message contains the text "I don't like the food there," the application may infer a negative opinion for the previous suggestion. In some aspects, the opinion may be identified by an opinion interpreter, such as opinion interpreter 120, as described above.

At add opinion operation 416, the identified opinion may be added to a set of opinions corresponding to the identified suggestion in the set of suggestions. In some aspects, a list of suggestions and opinions may be generated by the consensus determination application based on the extracted information and the above analysis and determination operations. This list may also be generated based on a set of suggestions and a corresponding set of opinions stored in memory or on disk, which may in turn be based on parsing and interpreting previous messages. In some cases, e.g., for a new suggestion, the corresponding set of opinions for the identified suggestion may not contain any previous opinions.

At consensus level determination operation 418, a current consensus level based on evaluating a relative number of opinions corresponding to each suggestion of the one or more suggestions may be determined. For instance, with reference to the example above, it may be determined that three message participants are in favor of going to Trieste Café for lunch and one message participant is in favor of Joe's Burger Barn for lunch. A simple level of consensus would indicate that the group is currently in favor of Trieste Café for lunch. Alternatively, a more specific level of consensus may indicate that 75% of message participants are in favor of Trieste Café, whereas 25% of message participants are in favor of Joe's Burger Barn. Alternatively still, e.g., where one conversation participant (e.g., a user copied on the conversation) has not responded, a more specific level of consensus may indicate that 60% of message participants are in favor of Trieste Café, 20% of message participants are in favor of Joe's Burger Barn, and 20% of message participants have not responded. In this case, even if the final participant favors Joe's Burger Barn, the group consensus would still favor Trieste Café (e.g., 60% consensus level for Trieste Café versus 40% consensus level for Joe's Burger Barn). As should be appreciated, a level of consensus may be determined and represented by any suitable means.

At present consensus operation 420, the current consensus among participants in a conversation may be presented to the user as a list of suggestions and corresponding opinions. The current consensus may be presented in text, audio, or video format, and may include charts, graphs, or other visual aids, e.g., consensus graph 222 and/or list consensus graph 332. The presentation of current consensus may also provide a list of users in favor of each suggestion, e.g. individuals in favor 224, or a number or percentage of users in favor of each suggestion, e.g. number indicator 226 and percentage indicator 328. The presentation of current consensus may also offer the user an opportunity to offer or change his or her opinion, e.g. selection button 228 and change button 326. In aspects, the current consensus may be presented by a consensus presenter, e.g. consensus presenter 122. In at least some aspects, based at least in part on the level of consensus, messages may be ranked within the conversation. That is, messages that indicate an opinion to a suggestion that corresponds with a higher level of consensus may be ranked above messages that indicate an opinion to a suggestion that corresponds with a lower level of consensus.

As should be appreciated, operations 402-420 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
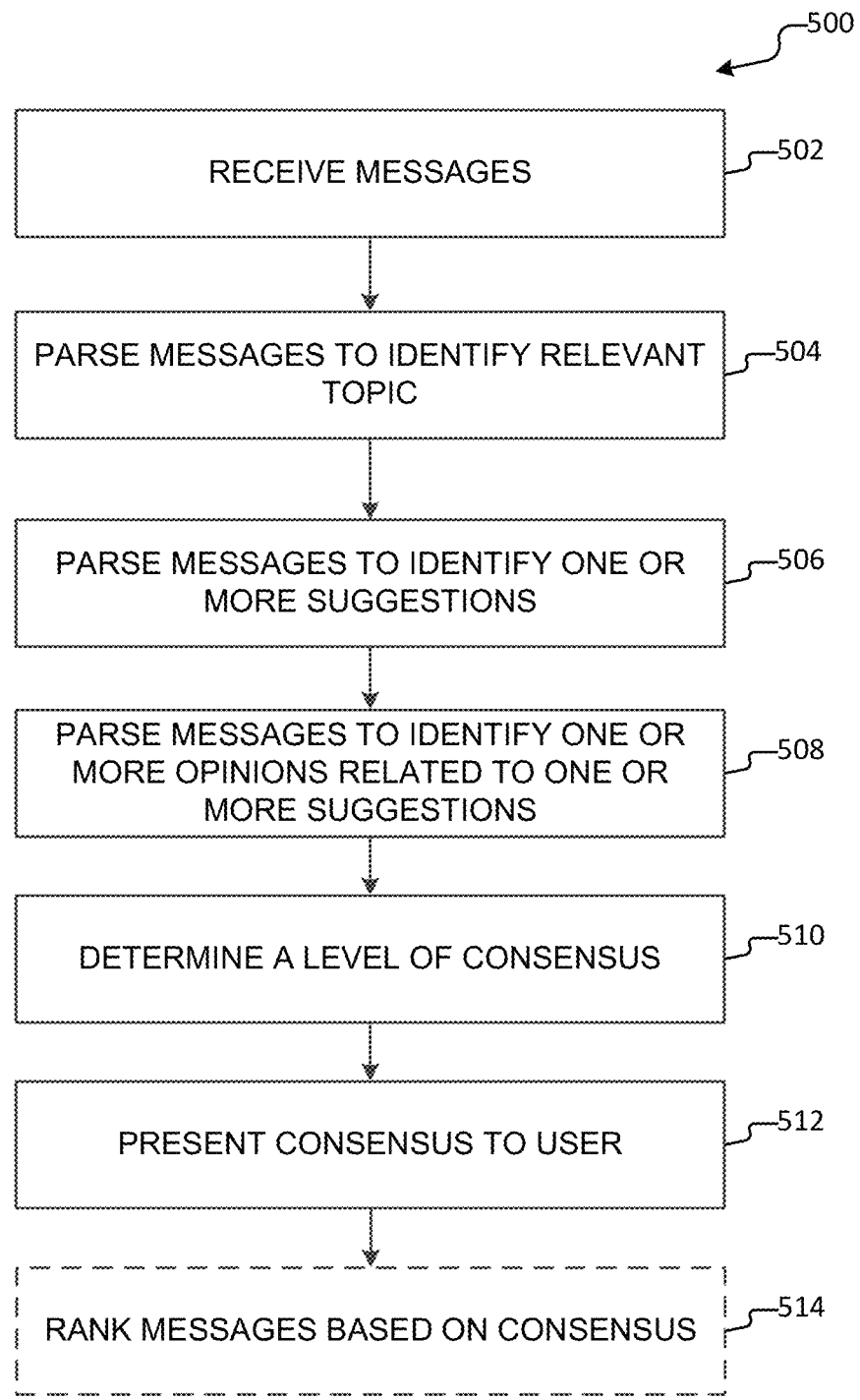
FIG. 5 illustrates a method for interpreting one or more messages to determine the suggestions and corresponding opinions contained therein, according to an example embodiment.

FIG. 5 illustrates a method for interpreting one or more messages to determine the suggestions and corresponding opinions contained therein, according to an example embodiment.

Method 500 begins with receive messages operation 502, where messages are received. In aspects, the messages may be received for storage, e.g., in storage location 126. Receiving messages may occur in a variety of ways, such as through SMTP email, SMS text messages, a Skype messages, Twitter tweets, Facebook messages, Google Chat messages, Google Hangout messages or videos, Apple iMessages, SnapChat videos, phone messages, any other recorded form of communication, or combination thereof, above. Moreover, the messages may be received by an appropriate messaging application executing on a computing device, e.g., client computing device 104 or server computing device 108.

At parse messages operation 504, the message content and metadata of the messages may be parsed to detect a topic, if any, to which each message relates. Frequently, the subject of a message may relate to a topic being discussed and other messages within a conversation may include the same subject. In other cases, a list of participants on a message and a timing of the message, combined with the body of the message, may be used to determine to which topic the message relates. In some forms of communication, the message may be included in a conversation structure that, when combined with the content of the message, allows the consensus determination application to determine the topic relevant to each message. For the purposes of consensus, each identified topic may be considered separately from each other topic when considering suggestions and opinions.

At parse messages operation 506, the message content and metadata may be parsed to identify one or more suggestions to which each message in a conversation relates, whether explicit in that message or not. Suggestion information may be determined by natural language processing ("NLP") such that the consensus determination application discerns whether the message creator for each message intended a new suggestion and the nature of that suggestion. For example, if a message contains the phrase "I think we should go to Trieste Café for lunch," the application may ascertain through NLP or another method, that the message contains the suggestion for "Trieste Café." Suggestion information may also be determined by metadata associated with the message. For example, if a message does not contain an explicit suggestion, but is a reply to another message including a previous suggestion, the application may infer that the previous suggestion is the suggestion relevant to the current reply.

In some aspects, the messages may be parsed by a message parser, e.g., message parser 112, a metadata aggregator, e.g. metadata aggregator 114, or a message content parser, e.g. message content parser 116. Any of these parsers may contribute data to a suggestion interpreter, e.g. suggestion interpreter 118, which may then interpret the data to extract the suggestion information from the messages as described above.

At parse messages operation 508, the message content and metadata of each message may be parsed to determine whether the message includes an opinion related to one or more suggestions within the relevant topic. Opinion information may be determined by natural language processing ("NLP") such that the consensus determination application discerns whether the message creator intended to support one of the suggestions relevant to the topic. For example, if a message contains the phrase "I think we should go to Trieste Café for lunch," the application may ascertain through NLP or another method, that the message offers an opinion in favor of the "Trieste Café" suggestion. Opinion information may also be determined by metadata associated with the message. For example, if a message does not contain an explicit suggestion, but is in reply to another message with a previous suggestion, the application may infer that current message's opinion relates to the previous suggestion. For example, if a message contains only the text "That sounds great," but is a reply to an email suggesting "Trieste Café," the application may infer that "That sounds great" is a positive opinion in favor of the "Trieste Café" suggestion. Similarly, if the message contains the text "I don't like the food there," the application may infer a negative opinion on the previous suggestion.

In some aspects, the messages may be parsed by a message parser, e.g., message parser 112, a metadata aggregator, e.g. metadata aggregator 114, or a message content parser, e.g. message content parser 116. Any of these parsers may contribute data to an opinion interpreter, e.g. opinion interpreter 120, which may then interpret the data to extract the opinion information from the messages, as described above.

At determine consensus operation 510, the suggestions parsed for the identified topic may be combined into a set of suggestions and grouped with their corresponding opinions to determine a level of consensus. This list of suggestions and opinions may be generated by the consensus determination application based on the data extracted in the previous parse message operations. This list may also be generated based on a set of suggestions and corresponding opinions stored in memory or on disk, which may in turn be based on parsing and interpreting previous messages. Based on the one or more suggestions, a level of consensus may be determined by evaluating the one or more opinions corresponding to each suggestion.

At present consensus operation 512, the current consensus may be presented to the user by listing the group of suggestions and corresponding opinions. The consensus may be presented in text, audio, or video format, and may include charts, graphs, or other visual aids, e.g., consensus graph 222 and/or list consensus graph 332. The presentation of current consensus may also provide a list of individuals in favor 224 of each suggestion 222 or a number or percentage of users in favor of each suggestion, e.g. number indicator 226 and percentage indicator 328. The presentation of consensus may also offer the user an opportunity to offer or change his or her opinion, e.g. selection button 228 and change button 326. In aspects, the current consensus may be presented by a consensus presenter, e.g. consensus presenter 122.

At optional rank messages operation 514, the messages may be ranked based at least in part on the current consensus. In aspects, a message that indicates an opinion for a suggestion associated with a higher level of consensus may be ranked higher than a message that indicates an opinion for a suggestion associated with a lower level of consensus. For example, with reference to the examples above, where the level for a group of message participants is 60% in favor of going to lunch at Trieste Café and 40% in favor of going to lunch at Joe's Burger Barn, messages indicating an opinion in favor of Trieste Café may be ranked above messages indicating an opinion in favor of Joe's Burger Barn. In aspects, messages that are ranked higher than other messages may be presented in a higher position among a listing of messages in a conversation, e.g., displayed in a list pane.

As should be appreciated, operations 502-514 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 6-9 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, as described herein.

Figure 6:
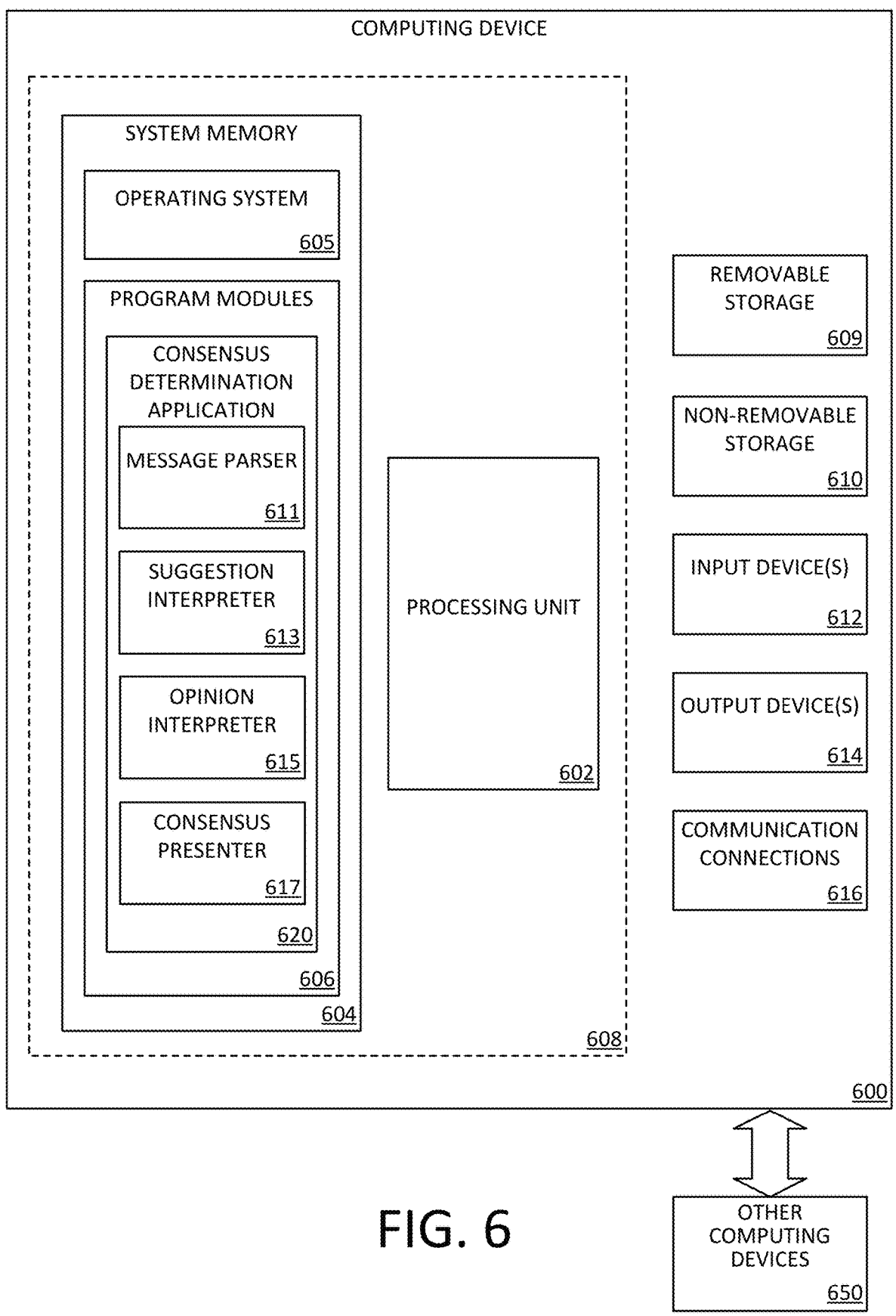
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing a consensus determination application 620 on a computing device (e.g., server computing device 108), including computer executable instructions for consensus determination application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running consensus determination application 620, such as one or more components with regard to FIG. 1 and, in particular, message parser 611 (e.g., including message parser 112, metadata aggregator 114, and message content parser 116), suggestion interpreter 613 (e.g., corresponding to suggestion interpreter 118), opinion interrupter 615 (e.g., corresponding to opinion interpreter 120), and/or consensus presenter 617 (e.g., corresponding to consensus presenter 122).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., consensus determination application 620) may perform processes including, but not limited to, the aspects, as described herein. Other program modules that may be used in accordance with aspects of the present disclosure, and in particular for presenting thumbnail previews in a message, may include message parser 611, suggestion interpreter 613, opinion interpreter 615, and/or consensus presenter 617, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
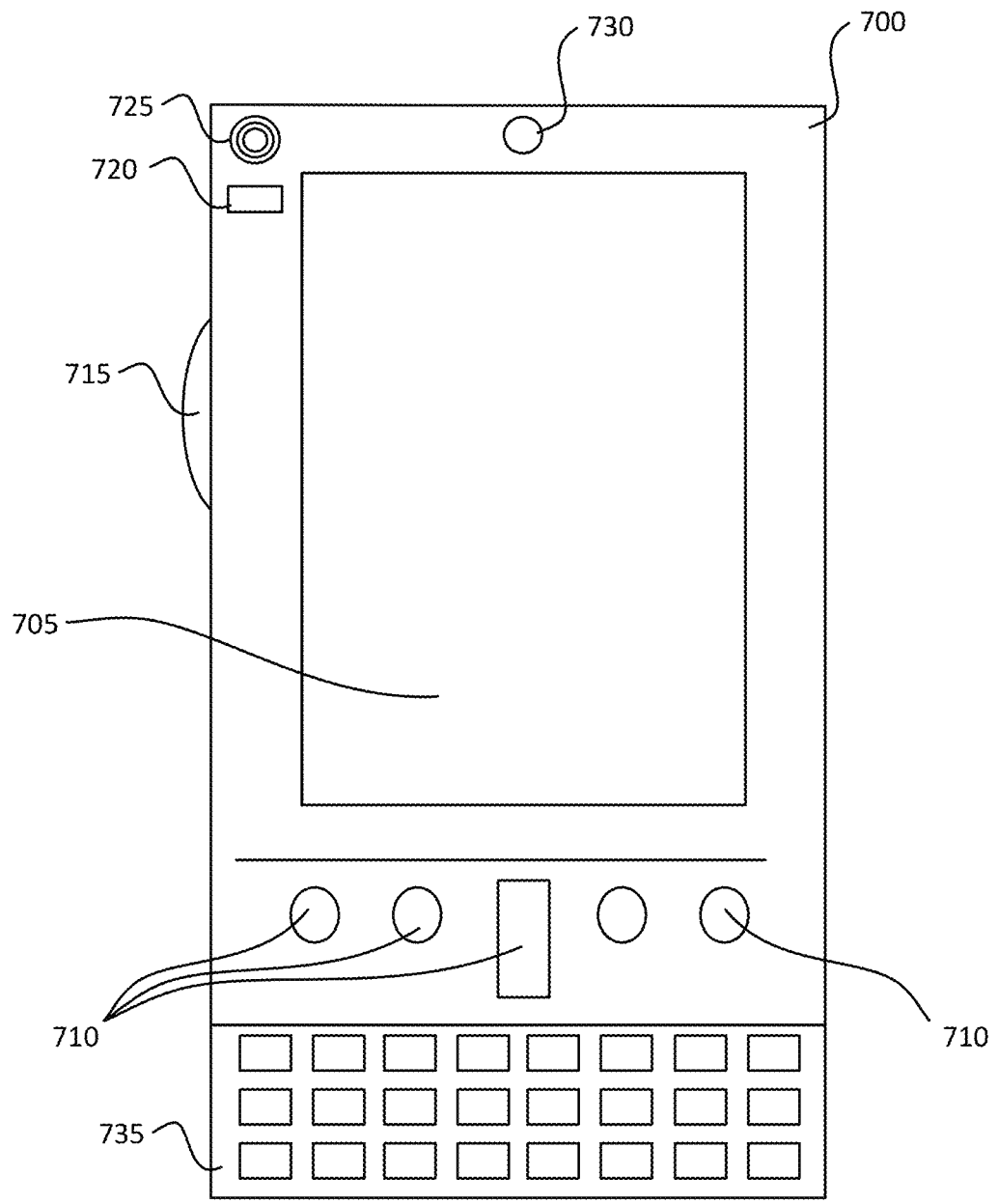
FIGS. 7A and 7B are simplified block diagrams of a mobile computing device with which aspects of the present disclosure may be practiced.
Figure 7B:
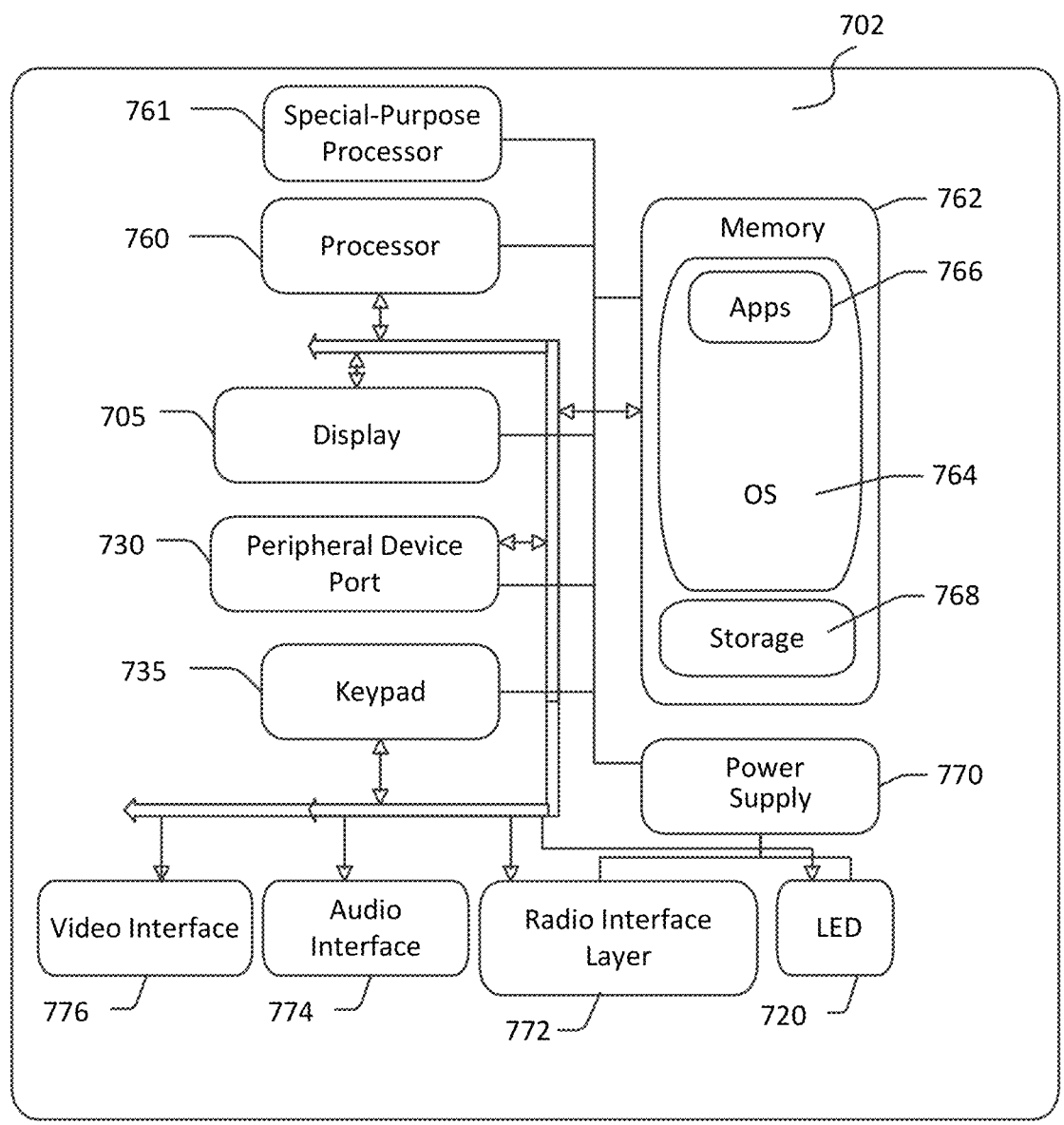

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a consensus determination application as described herein (e.g., message parser, suggestion interpreter, opinion interpreter, and/or consensus presenter, etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like. Audio interface 774, video interface 776, and keyboard 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and is not intended to limit the disclosure to a particular sequence of steps or a particular combination of hardware or software components.

Figure 8:
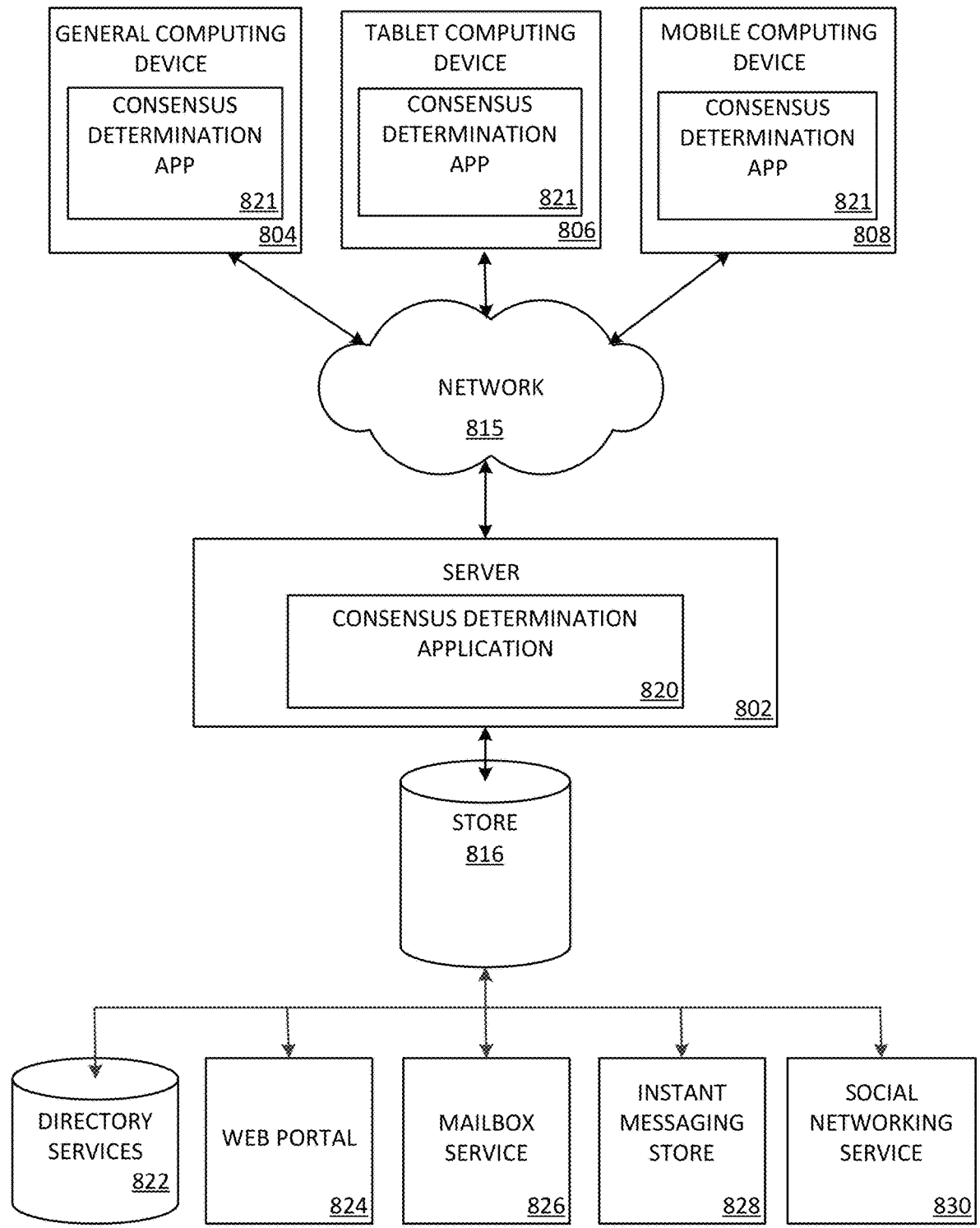
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various messages may be received and/or stored using a directory service 822, a web portal 824, a mailbox service 826, an instant messaging store 828, or a social networking service 830. The consensus determination application 821 may be employed by a client that communicates with server device 802, and/or the consensus determination application 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above with respect to FIGS. 1-5 may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
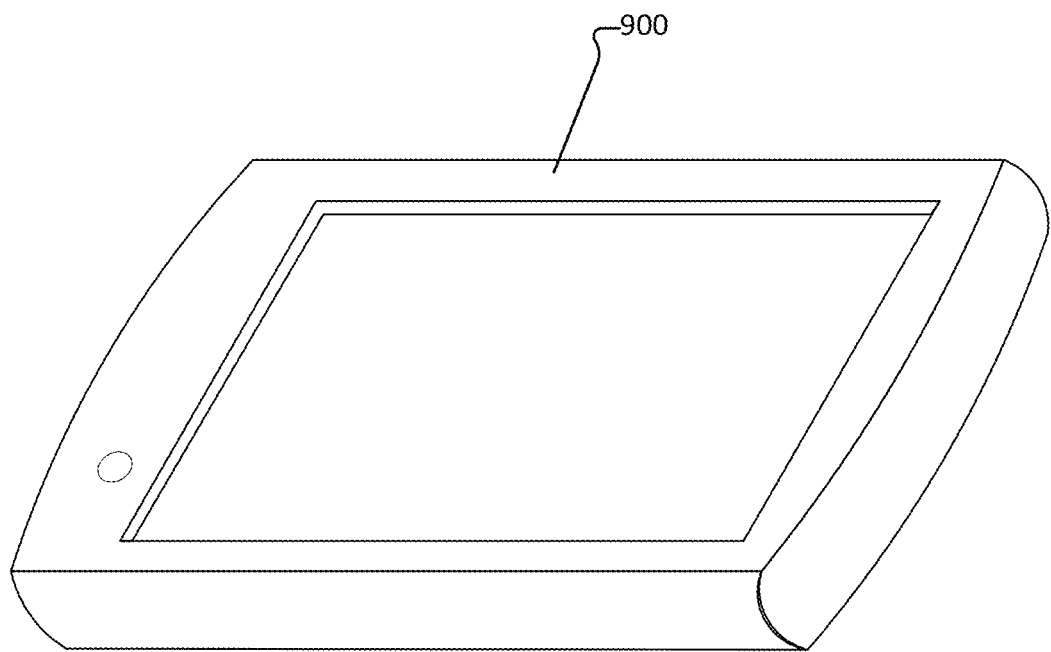
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

In a first aspect, a system is provided. The system includes a processing unit and a memory storing computer executable instructions that, when executed by the processing unit, cause the system to perform a method. The method includes receiving a message and parsing that message to extract information from the message. The method further includes analyzing the extracted information to identify a topic and any suggestions related to that topic discussed in the message. Additionally, the method involves adding the suggestion to a set of one or more suggestions if that suggestion is a new suggestion. The method further includes identifying an opinion related to the identified suggestion, based at least in part on analyzing the extracted information. The method further includes determining a level of consensus by evaluating a relative number of opinions corresponding to each of the one or more suggestions. The method further includes providing a visual representation of the level of consensus for each of the one or more suggestions.

In a second aspect, a method is provided. The method includes receiving a message and parsing that message to extract information from the message. The method further includes analyzing the extracted information to identify a topic and any suggestions related to that topic discussed in the message. Additionally, the method involves adding the suggestion to a set of one or more suggestions if that suggestion is a new suggestion. The method further includes identifying an opinion related to the identified suggestion, based at least in part on analyzing the extracted information. The method further includes determining a level of consensus by evaluating a relative number of opinions corresponding to each of the one or more suggestions. The method further includes providing a visual representation of the level of consensus for each of the one or more suggestions.

In a third aspect, a method is provided. The method includes receiving a plurality of message on a computer system, wherein the messages are related to a topic. The method further includes extracting metadata from the messages. The method further includes extracting content information from the messages using natural language processing. The method further includes identifying one or more suggestions from the messages based at least in part on the extracted content information. The method further includes identifying one or more opinions related to each suggestion based at least in part on the extracted content information and the extracted metadata. The method further includes determining a level of consensus by evaluating a relative number of opinions corresponding to each suggestion. The method further includes providing a visual representation of the level of consensus for each suggestion.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform a method, the method comprising:
   receiving, in a conversation associated with a suggestion, a first message from a first participant comprising first content and a second message from a second participant comprising second content;
   processing the first content of the first message to generate a first opinion of the first participant corresponding to the suggestion;
   processing the second content of the second message to generate a second opinion of the second participant corresponding to the suggestion;
   determining, based on the first opinion generated from the first content and the second opinion generated from the second content, a level of consensus for the suggestion;
   providing a consensus user interface comprising:
      the level of consensus for the suggestion; and
      a visual representation of the second participant indicating that the second participant is in favor of the suggestion;
   receiving, at the consensus user interface, a user selection of the visual representation of the second participant; and
   in response to the user selection, assigning a task associated with the suggestion to the second participant.

2. The system of claim 1, wherein the visual representation of the second participant includes at least a part of the second message associated with the second opinion.

3. The system of claim 2, wherein the visual representation of the second participant provides a control for modifying the second opinion.

4. The system of claim 3, wherein the control for modifying the second opinion indicates one of: a change in the second opinion of the second participant or an interpretation error in identifying the second opinion.

5. The system of claim 2, wherein the visual representation further comprises at least a part of the second content of the second message.

6. The system of claim 1, wherein the second opinion is one of:
   an indication of assent;
   an indication of dissent;
   ambiguous; or
   not expressed.

7. The system of claim 1, wherein the level of consensus is displayed in the consensus user interface as a chart or graphic.

8. The system of claim 1, wherein the level of consensus for the suggestion increases in response to performance of the task.

9. The system of claim 1, wherein the consensus user interface is displayed concurrently with the first message and the second message.

10. The system of claim 1, wherein the first message and the second message are email messages sent between the first participant and the second participant at an email application.

11. The system of claim 1, wherein the first content is one of:
    text;
    a narrative; or
    a description.

12. The system of claim 1, wherein determining the level of consensus is automatic based on the first opinion of the first content and the second opinion of the second content.

13. A method comprising:
receiving, in a conversation associated with a suggestion, a first message from a first participant and a second message from a second participant comprising first content and a second message from a second participant comprising second content;
processing the first content of the first message to generate a first opinion of the first participant corresponding to the suggestion;
processing the second content of the second message to generate a second opinion of the second participant corresponding to the suggestion;
determining, based on the first opinion generated from the first content and the second opinion generated from the second content, a level of consensus for the suggestion;
providing a consensus user interface comprising:
the level of consensus for the suggestion; and
a visual representation of the second participant indicating that the second participant is in favor of the suggestion;
receiving, at the consensus user interface, a user selection of the visual representation of the second participant; and
in response to the user selection, assigning a task associated with the suggestion to the second participant.

14. The method of claim 13, wherein the visual representation of the second participant includes at least a part of the second message associated with the second opinion.

15. The method of claim 14, wherein the visual representation of the second participant provides a control for modifying the second opinion.

16. The method of claim 15, wherein the control for modifying the second opinion indicates one of: a change in the second opinion of the second participant or an interpretation error in identifying the second opinion.

17. The method of claim 14, wherein the visual representation further comprises at least a part of the second content of the second message.

18. The method of claim 13, wherein the level of consensus is displayed in the consensus user interface as a chart or graphic.

19. A method comprising:
receiving, in a conversation associated with a suggestion, a first message from a first participant comprising first content and a second message from a second participant comprising second content;
processing a first opinion of the first participant in the first content of the first message and a second opinion of the second participant in the second content of the second message to generate a level of consensus for the suggestion, wherein the first opinion and the second opinion correspond to the suggestion;
providing a consensus user interface comprising:
a chart of the level of consensus for the suggestion;
a first visual representation of the first participant, wherein the first visual representation comprises an indication of the first opinion and at least a part of the first message; and
a second visual representation of the second participant, wherein the second visual representation comprises an indication of the second opinion and at least a part of the second message; and
receiving, at the consensus user interface, a user selection of the second visual representation of the second participant; and
in response to the user selection, assigning a task associated with the suggestion to the second participant.

20. The method of claim 19, wherein the first visual representation and the second visual representation are ranked based on the level of consensus.

* * * * *